July 30, 1940.   H. V. SHULER   2,209,853
ROTARY BRUSH
Filed Feb. 25, 1939
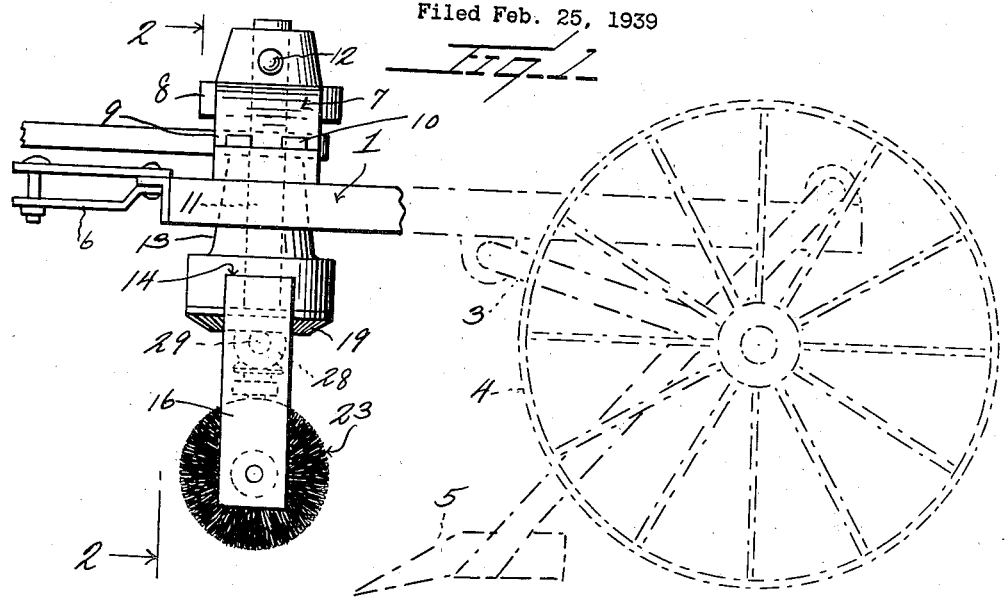
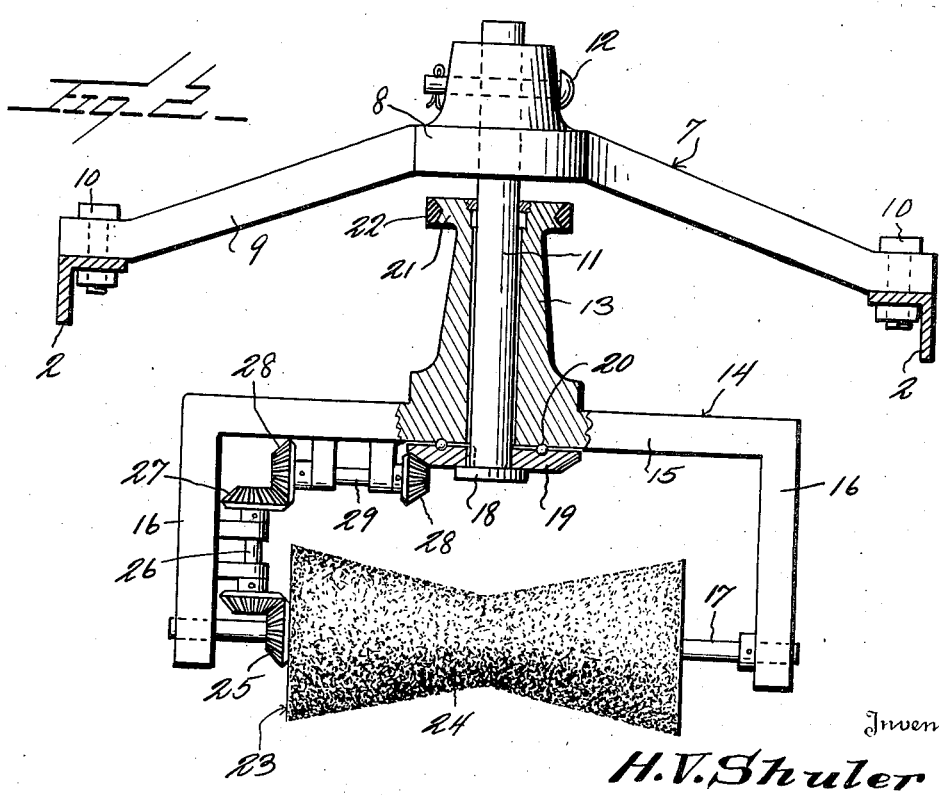
Inventor
H. V. Shuler
By Watson E. Coleman
Attorney Patented July 30, 1940

2,209,853

UNITED STATES PATENT OFFICE 2,209,853

ROTARY BRUSH

Harry V. Shuler, Ontario, Oreg., assignor of twenty per cent to Frank Miller, Ontario, Oreg.

Application February 25, 1939, Serial No. 258,521

4 Claims. (Cl. 15—21)

This invention relates to improvements in rotary brush structures and pertains particularly to a novel means whereby a brush of novel type may be given a desired rotary motion.

The present invention has for its primary object to provide a novel rotary brush structure wherein the brush, of novel design, is adapted to be given rotary motion simultaneously on perpendicularly related axes.

A more specific object of the present invention is to provide a novel brushing unit designed to be used in connection with the topping and digging of beet roots, whereby all of the leaf structure and green parts of the top of the beet root will be effectivey removed after the tops have been cut off and before the beet is lifted from the ground. In the topping and digging of beet roots, if such roots are of less than 4" in diameter, the topper severs the top along the line or plane at right angles to the long axis of the root and at the first leaf mark, but if the root is of greater than 4" diameter, the topping is done at an angle to the long axis of the root. The purpose of topping the root is to prevent the growth or development of top shoots and also of heat, after the beets have been dug and are placed in stacks or piles, but it sometimes occurs that on the larger beets, all of the green growth is not removed, therefore, such growth will cause a development of new shoots or heat which is undesirable.

The improved brush structure embodying the present invention is in the form of a double cone unit having the apices joined together and this novel brush is mounted upon a suitable supporting frame such as the frame of the beet root digger, in such a manner that as it is suspended above the ground in position for contact with the tops of the beet roots, with its long axis horizontally disposed, it may be given rotary motion on its long axis and simultaneously turned upon an axis extending vertically and through the transverse center of the brush structure. Thus when the brush is brought into contact with the upper part of the beet root after the top has been removed, this combined rotary brushing action will remove any green parts which may not have been properly removed by the cutter.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 illustrates the manner in which the brush structure may be mounted upon a beet digging or harvesting machine.

Fig. 2 is a sectional view taken on the line 2—2 of Fig. 1.

While, as previously stated, the present brush structure may be used in connection with the operation of topping and digging beet roots and it is to be understood it is not to be restricted to such use, however, the following description will refer generally to a beet digging machine and the mounting of the brush structure thereon, thus showing one specific application of the invention.

In Fig. 1, there is shown partly in full lines and partly in broken outline, a side elevational view of a conventionally illustrated beet digger. This digger structure includes a frame I having the side bars 2 and supported upon a suitable axle 3 which is connected with the ground engaging wheels 4. The numeral 5 generally designates plows connected with the frame and adapted for removing the beet roots from the ground. The forward end of the frame is provided with suitable means 6 for the connection of the structure with a tractor or other draft unit having a source of power for operating the brush structure which the frame I supports. For the mounting of the present invention upon a frame such as is indicated by the numeral I, there is provided a cross-beam 7 which has intermediate its ends a vertically disposed collar 8 from which extend the arms 9. The outer ends of the arms 9 are secured to the side bars 2 of the frame by bolts 10 or other suitable securing elements and the arms are angled with respect to the collar 8, so that the latter will be held in an elevated position with respect to the side beams 2 of the frame.

Extending vertically through the collar 8 is a fixed axle 11, the upper end of which is secured in the collar 8 by a cross-pin 12 or in any other suitable manner. Beneath the collar 8, the axle 11 passes longitudinally through the vertically arranged hub 13 which forms an integral part of a downwardly directed frame structure which is indicated generally by the numeral 14, and which includes the horizontally extending arms 15, each terminating in a downwardly extending portion 16. These portions 16 of the frame are in spaced parallel relation and at their lower ends are provided with suitable bearing openings to receive the ends of a brush shaft 17 which is suspended within the frame in the manner shown.

The lower end of the axle 11 terminates in a head 18 and interposed between this head and the lower end of the hub 13 is a beveled gear 19 which is keyed to the axle 11 and which has interposed between its top side and the adjacent hub, the anti-friction elements 20. Thus the hub 13 is suspended by the axle 11 for rotation upon the fixed gear 19 and the horizontally supported shaft 17 is adapted to be rotated on a vertical axis defined by the axle 11.

The upper end of the hub 13 is formed to provide a grooved pulley 21 about which a driving belt 22 may be passed and connected with any suitable source of power such as may be supplied by the tractor or other machine employed for pulling the digger.

The numeral 23 generally designates the double cone brush constituting a part of the present invention. This brush is formed so as to have the two conical sections 24 which are joined at their apices and the transverse center of this brush or the part of narrowest width is directly beneath the axle 11. Thus when the frame 14 is rotated about the axle 11, the center of rotation will pass through the transverse center of the brush and shaft 17 and will be perpendicular to the shaft. Upon one end of the brush body there is fixed a bevel gear 25 which also encircles and is secured to the shaft 17. The arm 16 adjacent this gear supports a short vertically arranged shaft 26 upon each end of which is a bevel gear 27, one thereof meshing with the gear 25, as shown. The other gear 27 meshes with a similar gear 28 which is supported upon the horizontal gear shaft 29, which is suspended as shown upon the underside of the horizontal portion 15 of the frame and a corresponding gear also indicated by the numeral 28 and located upon the other end of the shaft 29 meshes with the fixed gear 19.

From the foregoing, it will be readily seen that when the present brush device is mounted in the manner illustrated and rotary power is transmitted by the belt 22 or in any other suitable manner to the hub 13, so that the latter will be rotated around the axle 11, the horizontally disposed brush 23 will be turned on an axis passing through the axle 11 and will also be rotated by the gear train connecting it with the fixed gear 19, to turn on a horizontal axis which intersects the vertical turning axis. When the brush is used upon a beet digging machine in the manner described, it will be disposed in the necessary close proximity to the ground so that the narrowest part of the brush will pass over the upper ends of the beet roots from which the tops have been cut. Thus the inclined portions of the brush will wipe around the top of the beet root and clean off any leaves or other green growth which was not removed by the topper.

While the brush structure may be made up of any suitable materials, it is preferred that the bristles be of bamboo.

What is claimed is:

1. A rotary brush structure, comprising a frame, a brush supported in said frame for rotation on its long axis, said brush being constricted through its transverse center to form two connected cone-like portions, a hub forming a part of said frame, a supporting axle for said hub, said axle being disposed perpendicularly to the long axis of said brush, means for rotating the hub and frame about said axle, and means for imparting simultaneous rotary motion to the brush for the turning of the latter on its long axis.

2. In a structure of the character described, a wheel supported frame, a beam disposed across said frame and including a collar intermediate its ends, an axle having one end secured in said collar and suspended therefrom, a frame suspended from said axle to turn thereabout, a rotary shaft carried by said frame and disposed perpendicularly to the axle, the axes of rotation for the frame on the axle and the shaft intersecting, an elongate brush body supported upon said shaft to turn therewith, means for imparting rotary motion to the frame, and means for imparting rotary motion to said shaft.

3. In a structure of the character described, a wheel supported frame, a beam disposed across said frame and including a collar intermediate its ends, an axle having one end secured in said collar and suspended therefrom, a frame suspended from said axle to turn thereabout, a rotary shaft carried by said frame and disposed perpendicularly to the axle, the axes of rotation for the frame on the axle and the shaft intersecting, an elongated brush body supported upon said shaft to turn therewith, means for imparting rotary motion to the frame, a gear member fixed to said axle and disposed within the frame, and a gear train supported by the frame and forming a driving connection between said fixed gear and said brush supporting shaft.

4. In a structure of the character described, a wheel supported unit, an axle supported by and maintained vertically with respect to said unit, a hub encircling said axle and formed integral with a frame, a gear fixed to the lower end of said axle, anti-friction means interposed between said gear and the hub whereby the hub may rotate on the gear about the axle, a shaft rotatably supported by said frame and maintained horizontally thereby, an elongated brush carried by the shaft, said brush being in the form of a double cone and tapering from each end toward the transverse center thereof, the said transverse center of the brush being disposed beneath said axle, a gear carried by the brush supporting shaft, a gear train connecting the axle supported gear with the first-mentioned gear, and a pulley formed integral with said hub for facilitating the application of rotary power thereto.

HARRY V. SHULER.